(12) United States Patent
Ha et al.

(10) Patent No.: US 7,133,462 B2
(45) Date of Patent: Nov. 7, 2006

(54) METHOD AND APPARATUS FOR DETERMINING MODULATION SCHEME FOR RETRANSMISSION IN A COMMUNICATION SYSTEM

(75) Inventors: Sang-Hyuck Ha, Suwon-shi (KR); Min-Goo Kim, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 722 days.

(21) Appl. No.: 10/300,476

(22) Filed: Nov. 20, 2002

(65) Prior Publication Data
US 2003/0147474 A1    Aug. 7, 2003

(30) Foreign Application Priority Data
Nov. 20, 2001    (KR)    ............... 10-2001-0072485

(51) Int. Cl.
| | |
|---|---|
| H04L 27/04 | (2006.01) |
| H04L 27/12 | (2006.01) |
| H04L 27/20 | (2006.01) |
| H04L 27/36 | (2006.01) |
| H03K 7/10 | (2006.01) |
| H04B 7/14 | (2006.01) |
| H04B 1/02 | (2006.01) |

(52) U.S. Cl. .............. 375/295; 375/298; 375/308; 332/108; 455/17; 455/102
(58) Field of Classification Search .............. 375/295, 375/298, 308; 332/108, 119, 151; 455/17, 455/61, 102
See application file for complete search history.

(56) References Cited
U.S. PATENT DOCUMENTS 5,444,718 A    8/1995    Ejzak et al.
5,577,046 A    11/1996    Diachina et al.
6,163,869 A    12/2000    Langmann (Continued)

FOREIGN PATENT DOCUMENTS

EP    1 227 603    7/2002

(Continued)

OTHER PUBLICATIONS

Qiao et al., Goodput enhancement of IEEE 802.11a wireless LAN via link adaptation, Jun. 11-14, 2001, IEEE Communications, 2001. ICC 2001. IEEE International Conference on vol. 7, pp. 1995-2000.*

(Continued)

*Primary Examiner*—Jay K. Patel
*Assistant Examiner*—Aslan Ettehadieh
(74) *Attorney, Agent, or Firm*—Dilworth & Barrese LLP

(57) ABSTRACT

A method and apparatus for determining an optimum modulation scheme for a retransmission in a communication system supporting HARQ. When two modulation schemes are available, at an initial transmission, information is modulated in the lower-order modulation scheme if a first MPR is less than a first threshold, and in the higher-order modulation scheme if the first MPR is greater than or equal to the first threshold. Here, an MPR is determined by an EP size, the number of available Walsh codes, and the number of slots per sub-packet that are used for a transmission. To select one of the modulation schemes for a retransmission, a second MPR is calculated using an EP size, the number of available Walsh codes, and the number of slots per sub-packet that are used for the retransmission. If the first MPR is equal to or less than a second threshold greater than the first threshold, the lower-order modulation scheme is selected. If the second MPR is greater than the second threshold, the higher-order modulation scheme is selected.

14 Claims, 14 Drawing Sheets

U.S. PATENT DOCUMENTS

| | | | |
|---|---|---|---|
| 6,192,070 B1 * | 2/2001 | Poon et al. | 375/222 |
| 6,262,994 B1 * | 7/2001 | Dirschedl et al. | 370/465 |
| 6,748,021 B1 * | 6/2004 | Daly | 375/261 |
| 6,952,454 B1 * | 10/2005 | Jalali et al. | 375/260 |
| 2002/0110101 A1 * | 8/2002 | Gopalakrishnan et al. | 370/335 |
| 2003/0031122 A1 | 2/2003 | Kim et al. | |
| 2003/0045307 A1 * | 3/2003 | Arviv et al. | 455/464 |
| 2003/0048856 A1 * | 3/2003 | Ketchum et al. | 375/260 |

FOREIGN PATENT DOCUMENTS

| | | |
|---|---|---|
| EP | 1 246 385 | 10/2002 |
| KR | 2002-82603 | 10/2002 |
| KR | 2003-5897 | 1/2003 |

OTHER PUBLICATIONS

Rasmussen et al. (1992) "A performance Analysis of Trellis Coded Hybrid-ARQ Protocols in a Fading Envrionment" GLOBECOM '92 IEEE, vol. 12, pp. 899-904.

* cited by examiner

US 7,133,462 B2

METHOD AND APPARATUS FOR DETERMINING MODULATION SCHEME FOR RETRANSMISSION IN A COMMUNICATION SYSTEM

PRIORITY

This application claims priority to an application entitled "Method and Apparatus for Determining Modulation Scheme for Retransmission in a Communication System" filed in the Korean Industrial Property Office on Nov. 20, 2001 and assigned Serial No. 2001-72485, the contents of which are hereby incorporated by reference herein.

BACKGROUND OF THE INVENTION

1. Field of the Invention

The present invention relates generally to a communication system that determines a modulation and coding scheme adaptively, and in particular, to a method and apparatus for determining an optimum modulation scheme for retransmission in a given environment.

2. Description of the Related Art

In a future mobile communication system (3GPP2 1xEV-DV: $3^{rd}$ Generation Partnership Project 2 1xEvolution-Data and Voice, or 3GPP HSDPA: 3GPP High Speed Downlink Packet Access), if the number of available Walsh codes, that is, an available Walsh code space is given, the size of an encoder packet (EP) to be transmitted and the number of slots per sub-packet are determined according to channel condition and data backlog. A slot is a transmission unit having a predetermined time span and data backlog indicates the state of a buffer that stores data received from a higher layer. If the EP size and the number of slots per sub-packet are determined, this implies that a data rate is determined. An EP is then transmitted by selecting one of as many combinations of modulation schemes and coding rates as modulations supported in the system. For efficient packet transmission, it is very important to select an optimum modulation and coding scheme that minimizes BER (Bit Error Rate) and PER (Packet Error Rate) because the error rate of each modulation and coding scheme is different.

According to a proposed modulation scheme determining method for 3GPP2 1xEV-DV under standardization, a modulation scheme is selected referring to a look-up table listing data rates mapped to modulation schemes on a one-to-one basis for each EP size in a given Walsh code space. The look-up table, was made to offer an optimum modulation and coding scheme only at an initial transmission, which minimizes BER or PER under a given condition. However, even if a sub-packet is to be retransmitted due to failure of the previous transmission, the look-up table is still used. Without considering the previous sub-packet transmissions, therefore, an inappropriate modulation scheme may be selected, resulting in degradation of system performance.

SUMMARY OF THE INVENTION

It is, therefore, an object of the present invention to provide an apparatus and method for determining an optimum modulation scheme for a retransmission by taking previous sub-packet transmissions into account in a mobile communication system using a variable modulation scheme and IR (Incremental Redundancy) as an HARQ (Hybrid Automatic Retransmission reQuest) technique.

To achieve the above and other objects, according to one aspect of the present invention, in a communication system using two modulation schemes, information is modulated at an initial transmission in the lower-order modulation scheme if a first MPR (Modulation Order Product Code Rate) is less than a first threshold, and in the higher-order modulation scheme if the first MPR is greater than or equal to the first threshold. Here, an MPR indicates a spectral efficiency for a transmission and is determined by an EP size, the number of available Walsh codes, and the number of slots per sub-packet that are used for the transmission. To select one of the modulation schemes for a retransmission, a second MPR is calculated using an EP size, the number of available Walsh codes, and the number of slots per sub-packet that are used for the retransmission. If the second MPR is equal to or less than a second threshold greater than the first threshold, the lower-order modulation scheme is selected. If the second MPR is greater than the second threshold, the higher-order modulation scheme is selected.

According to another aspect of the present invention, in a communication system using at least three modulation schemes, information is modulated at an initial transmission in the lowest-order modulation scheme if a first MPR is less than a first threshold, and in a modulation scheme having a modulation order higher than the lowest modulation order if the first MPR is greater than or equal to the first threshold. Here, an MPR indicates a spectral efficiency for a transmission and is determined by an EP size, the number of available Walsh codes, and the number of slots per sub-packet that are used for the transmission. To select one of the available modulation schemes for retransmission, a second MPR indicating a spectral efficiency for the retransmission is calculated using an EP size, the number of available Walsh codes, and the number of slots per sub-packet that are used for the retransmission. If the second MPR is equal to or less than a second threshold greater than the first threshold, the lowest-order modulation scheme is selected. If the second MPR is greater than the second threshold and equal to or less than a third threshold which is greater than the second threshold, an equivalent MPR ($MPR_e$) is calculated using the first MPR and the second MPR. If $MPR_e$ is less than a fourth threshold, a low-order modulation scheme is selected among modulation schemes excluding the lowest-order modulation scheme. If $MPR_e$ is greater than or equal to the fourth threshold, a high-order modulation scheme is selected among the modulation schemes excluding the lowest-order modulation scheme. If the second MPR is greater than the third threshold, the highest-order modulation scheme is selected.

According to a further aspect of the present invention, in a communication system using two modulation schemes, information is modulated in one of the modulation schemes at an initial transmission. An apparatus for determining a modulation scheme for a retransmission includes a plurality of modulators using different modulation schemes, a modulator selector, and a demultiplexer. The modulator selector calculates an MPR for each transmission and compares the MPR with a threshold. According to the comparison result, the modulator selector selects one of the modulation schemes and outputs a modulator selection signal indicating the determined modulation scheme. The demultiplexer outputs input data to a modulator selected according to the modulator selection signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
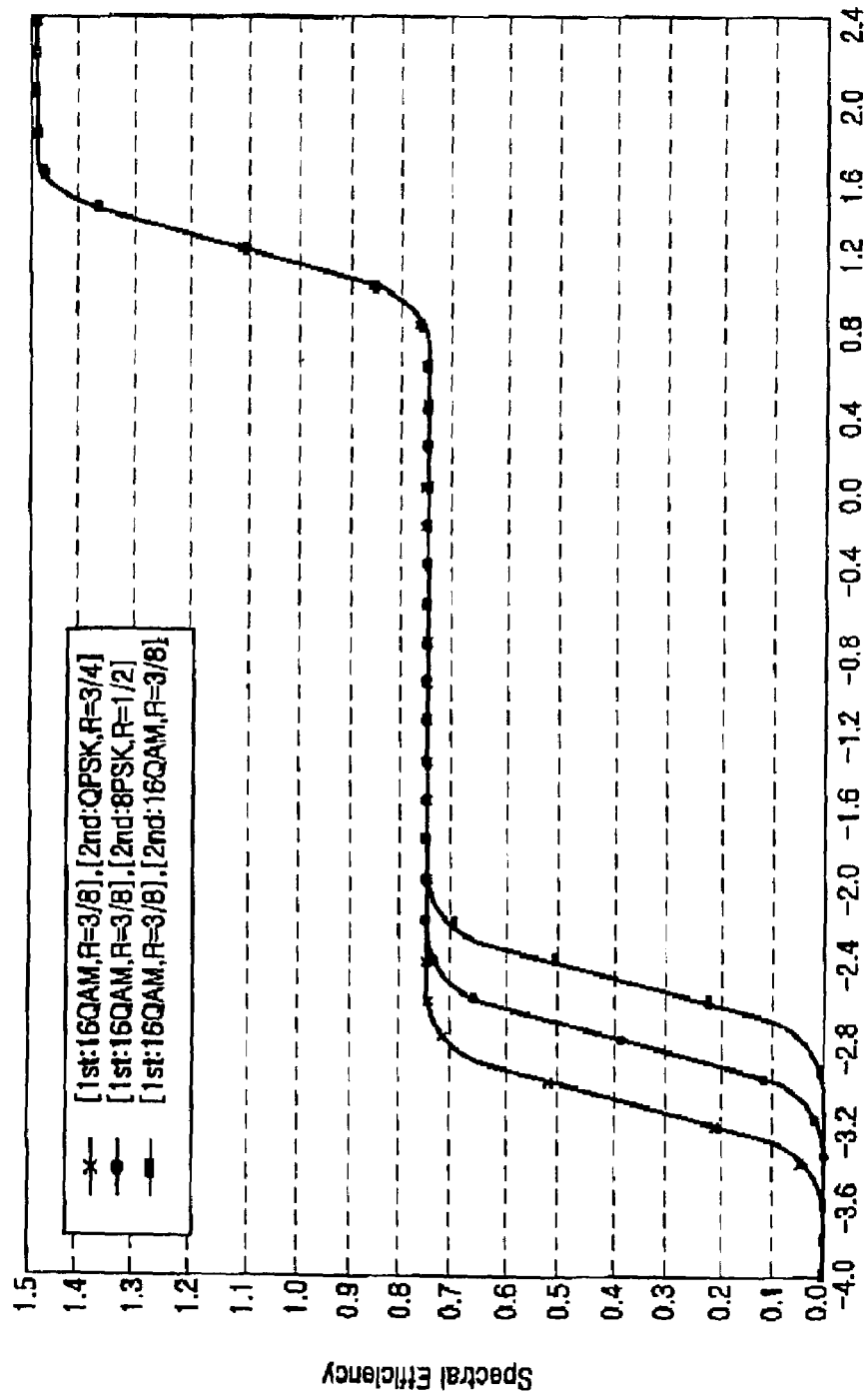
FIG. 1 illustrates graphs showing spectral efficiency versus $E_c/N_t$ (dB) in QPSK, 8PSK, and 16QAM for retransmission when $MPR_2=1.5$ and $MPR_e=0.75$.

Preferred embodiments of the present invention will be described herein below with reference to the accompanying drawings. In the following description, well-known functions or constructions are not described in detail since they would obscure the invention in unnecessary detail.

Hereinbelow, the relation between a modulation and coding scheme for an initial transmission and a modulation and coding scheme for a retransmission will be analyzed and how to determine optimum modulation schemes for the initial transmission and the retransmission will be described. Terms "modulation scheme" and "modulation order" are used in the same sense. Variables used herein are defined as follows.

N: an EP size;

$W_k$: the number of available Walsh codes for a kth transmission;

$S_k$: the number of slots per sub-packet at the kth transmission;

$MPR_k$: the product of a modulation order and a code rate for the kth transmission;

$m_k$: a modulation order for the kth transmission; and $r_k$: a code rate for the kth transmission.

Determination of Modulation Scheme for Initial Transmission

In a digital communication system, as a modulation order and a code rate decrease, BER and PER also decrease. If an available frequency bandwidth is given, the product of a modulation order and a code rate is fixed and the modulation order and the code rate cannot both be decreased at the same time. Considering the trade-off relation between the modulation order and the code rate, therefore, a modulation and coding scheme must be selected which minimizes the error rate of the system in a given environment.

A method of selecting a modulation scheme for initial transmission is disclosed in Korea Patent Application No. 2001-41884 entitled "Apparatus and Method for Determining Modulation Scheme in a Communication system", filed by the present applicant. According to this application, an optimum modulation and coding scheme is determined for initial transmission by calculating MPR (Modulation order Product code Rate), a kind of entropy reflecting spectral efficiency. MPR is defined as the average number of information bits per modulation symbol.

On the assumption that an EP size, a Walsh code space, and the number of slots per sub-packet are predetermined, an MPR for the initial transmission, $MPR_1$ is determined, as defined above, by $$MPR_1 = \frac{N}{\frac{W_1}{32} \times 1536 \times S_1} \quad (1)$$

$$= \frac{N}{48 \times W_1 \times S_1}$$

$$= m_1 \times \frac{N}{m_1 \times \frac{W_1}{32} \times 1536 \times S_1}$$

$$= m_1 \times r_1$$

where 1536 and 32 are respectively the number of PN (Pseudorandom Noise) chips per slot (1.25 ms) and the length of a Walsh code assigned to a packet channel in 3GPP2 1xEV-DV. The number of PN chips per slot and the Walsh length are system-dependent. Therefore, 1536 and 32 are replaced with appropriate values if different PN chip number and Walsh length are used. As noted from Eq. (1), MPR can be expressed as the product of a modulation order and a code rate. According to the highest modulation order and code rate available for the initial transmission, $MPR_1$ ranges as follows.

$$0 < MPR_1 \leq m_{max} \times r_{max} \quad (2)$$

In 3GPP2 1xEV-DV, since the highest modulation order and code rate are 4 and 4/5, respectively, $MPR_1$ is greater than 0 and equal to or less than 3.2 by Eq. (2).

Based on $MPR_1$, a modulation order m1 for the initial transmission is determined by

TABLE 1

| If $MPR_1 < TH_E$, | $m_1 = 2$ (Select QPSK) |
| Else, | $m_1 = 4$ (Select 16QAM) |

In Table 1, $TH_E$ is a threshold MPR, emprically 1.5 in 3GPP2 1xEV-DV.

Determination of Modulation Scheme for Retransmission

The future mobile communication system (3GPP2 1xEV-DV or 3GPP HSDPA) supports HARQ for retransmitting part of an EP when its transmission fails. HARQ techniques include CC (Chase Combining) and IR (Incremental Redundancy). IR offers better performance than CC because an initial transmission sub-packet is different from its retransmission sub-packet and a coding gain is obtained due to the decrease of an accumulated code rate in IR.

As is done for an initial transmission, an optimum modulation and coding scheme must be selected for a retransmission, though in a different manner. While a modulation scheme is determined for the initial transmission according to an EP size, a Walsh code space, and the number of slots per sub-packet as illustrated in Table 1, previously transmitted sub-packets must be considered in determining a modulation scheme for a retransmission.

Especially in a communication system using IR as an HARQ technique, spectral efficiency decreases as the number of transmissions increases. Hence, an equivalent spectral efficiency must be detected taking previously transmitted sub-packets into account to select an optimum modulation scheme for a retransmission.

At the initial transmission, a code rate is lower than 1.0. For example, it is lower than 4/5 in 3GPP2 1xEV-DV. However, due to the presence of an initial transmission sub-packet, the highest code rate is preferably not limited at the retransmission. Therefore, a code rate may be higher than 1.0 at the retransmission. In this case, an error rate drastically increases as compared to a code rate lower than 1.0. If some modulation and coding schemes have a code rate higher than 1.0 and others have a code rate equal to or lower than 1.0, it is preferable to exclude the modulation and coding scheme having a code rate higher than 1.0 at the retransmission. If all available modulation and coding schemes have a code rate higher than 1.0 for retransmission, a modulation scheme having the highest modulation order allowed in the system is preferably used.

Table 2 illustrates available modulation schemes according to the range of a retransmission MPR, $MPR_k$ ($k \geq 2$) and its corresponding code rate range.

TABLE 2

If $0 < MPR_k \leq 2.0$ (that is, $0 < r_k \leq \frac{2.0}{m_k}$), $m_k \in \{2, 3, 4\}$ Else, if $2.0 < MPR_k \leq 3.0$ (that is, $\frac{2.0}{m_k} < r_k \leq \frac{3.0}{m_k}$), $m_k \in \{3, 4\}$ Else, that is, $r_k > \frac{3.0}{m_k}$, $m_k \in \{4\}$ If the range of $MPR_k$ is determined, available modulation schemes are obtained by Table 2. One of the available modulation schemes is finally selected according to an equivalent spectral efficiency $MPR_e$ which reflects previous transmission sub-packets and the current retransmission sub-packet. According to the present invention, a modulation order and a code rate for a retransmission are finally determined based on $MPR_e$.

When an initial transmission fails and retransmission is to be carried out, a spectral efficiency for a first retransmission, $MPR_2$ is calculated in the same manner as $MPR_1$ by $$MPR_2 = \frac{N}{\frac{W_2}{32} \times 1536 \times S_2} \quad (3)$$

$$= \frac{N}{48 \times W_2 \times S_2}$$

$$= m_2 \times \frac{N}{m_2 \times \frac{W_2}{32} \times 1536 \times S_2}$$

$$= m_2 \times r_2$$

As stated before, both $MPR_2$ and $MPR_e$ are required to select an optimum modulation scheme for the first retransmission. Given a Walsh code space $W_2$ and the number $S_2$ of slots per sub-packet for the first retransmission, $$MPR_e = \frac{N}{\frac{W_1}{32} \times 1536 \times S_1 + \frac{W_2}{32} \times 1536 \times S_2} \quad (4)$$

$$= \frac{N}{48 \times (W_1 \times S_1 + W_2 \times S_2)}$$

$$= \frac{1}{\left(\frac{N}{48 \times W_1 \times S_1}\right)^{-1} + \left(\frac{N}{48 \times W_2 \times S_2}\right)^{-1}}$$

$$= \frac{1}{MPR_1^{-1} + MPR_2^{-1}}$$

As shown in Eq. (4), the equivalent spectral efficiency $MPR_e$ reflecting the two transmissions is calculated using the EP size N, the Walsh code spaces $W_1$ and $W_2$, and the slot numbers $S_1$ and $S_2$, or $MPR_1$ and $MPR_2$ computed by Eq. (1) and Eq. (3). It is to be noted here that both code rates for the initial transmission and the retransmission must be equal to or lower than 1.0 to select a modulation scheme for the retransmission based on $MPR_e$ calculated by Eq. (4). If the code rate for the retransmission is higher than 1.0, the retransmission gets more influential than the initial transmission. Under such circumstances, it is inappropriate to determine the modulation scheme for the retransmission according to $MPR_e$. Available modulation schemes are limited according to the range of $MPR_2$ for the same reason.

On the other hand, if both the code rates for the initial transmission and the retransmission are equal to or lower than 1, $MPR_e$ is useful in selecting an optimum modulation scheme for the retransmission. As disclosed in the above Korean application No. 2001-41884, if $MPR_e$ is less than the threshold $TH_E$, an error rate decreases as a modulation order decreases. If $MPR_e$ is greater than the threshold $TH_E$, the error rate decreases as the modulation order increases. Accordingly, it is preferable to select an available lowest-order modulation scheme in the former case and an available highest-order modulation scheme in the latter case in order to minimize the error rate of the system. In the three cases depicted in Table 2, an optimum modulation scheme is selected for the retransmission as follows.

(1) $0<MPR_2 \leq 2.0$ (available modulation orders $m_2$ are 2, 3 and 4): since $0<MPR_1 \leq 3.2$, $$MPR_e = \frac{MPR_1 \times MPR_2}{MPR_1 + MPR_2} \leq \frac{3.2 \times 2.0}{3.2 + 2.0}$$
$$= 1.231 < TH_E(=1.5)$$

Thus, the lowest order 2 is selected as $m_2$ irrespective of $MPR_1$.

(2) $2.0<MPR_2 \leq 3.0$ (available modulation orders $m_2$ are 3 and 4): since $0<MPR_1 \leq 3.2$, $$MPR_e = \frac{MPR_1 \times MPR_2}{MPR_1 + MPR_2} \leq \frac{3.2 \times 3.0}{3.2 + 3.0} = 1.548$$

Since $MPR_e$ will be less than 1.5 in most cases in this range of $MPR_1$ and $MPR_2$, the lower order 3 will usually be selected as $m_2$. Yet, in cases where $MPR_e$ is equal to or greater than 1.5, the higher order 4 is selected as $m_2$. Therefore, this case branches into two sub-cases depending on the range of $MPR_2$, as shown immediately below:

(2-1) $2.0<MPR_2 \leq 2.823$:

$$MPR_e = \frac{MPR_1 \times MPR_2}{MPR_1 + MPR_2} \leq \frac{3.2 \times 2.823}{3.2 + 2.823} = 1.499 < TH_E(=1.5)$$

Thus, the lower order 3 is selected as $m_2$ irrespective of $MPR_1$.

(2-2) $2.823<MPR_2 \leq 3.0$: This depends on the value of $MPR_1$ in the equation for $MPR_e$. If $MPR_e$ is less than 1.5, the lower order 3 is selected as $m_2$ and $MPR_e$ is equal to or greater than 1.5, the higher order 4 is selected as $m_2$.

(3) $MPR_2>3.0$ (an available modulation order $m_2$ is 4): The only available modulation order is 4. Therefore, $m_2$ is always 4 irrespective of $MPR_1$.

To cover two or more retransmission occurrences, the above modulation scheme determination method for retransmission is generalized as follows.

First, an MPR for the current retransmission, $MPR_k$ is calculated by $$MPR_k = \frac{N}{\frac{W_k}{32} \times 1536 \times S_k} = \frac{N}{48 \times W_k \times S_k} \quad (5)$$

$$= m_k \times \frac{N}{m_k \times \frac{W_k}{32} \times 1536 \times S_k} = m_k \times r_k$$

If $0<MPR_k \leq 2.0$, QPSK is selected, and if $MPR_k>3.0$, 16QAM is selected.

If $2.0<MPR_k \leq 3.0$, an equivalent MPR reflecting the previous transmissions up to now, $MPR_e$ is calculated by $$MPR_e = \frac{1}{\sum_{i=1}^{k}\left(\frac{N}{48 \times W_i \times S_i}\right)^{-1}} = \frac{1}{\sum_{i=1}^{k} MPR_i^{-1}} \quad (6)$$

$$= \frac{1}{\sum_{i=1}^{k-1} MPR_i^{-1} + MPR_k^{-1}} = \frac{1}{MPR_p^{-1} + MPR_k^{-1}}$$

where $MPR_p = \sum_{i=1}^{k-1} MPR_i^{-1}$

In Eq. (6), $MPR_p$ is an MPR reflecting the whole previous sub-packet transmissions from time 1 to time k−1 if the current time is k. Until sub-packet retransmission is successful, $MPR_p$ is updated at each retransmission and stored in a receiver of a mobile station.

Table 3 below sums up selection of an optimum modulation scheme for retransmission according to $MPR_k$ ($k \geq 2$) and $MPR_e$.

TABLE 3

| | |
|---|---|
| If $0 < MPR_k \leq TH_L$, | $m_k$ = 2 (Select QPSK) |
| Else, if $TH_L < MPR_k \leq TH_H$, | |
|   if $MPR_e < TH_E$, | $m_k$ = 3 (Select 8PSK) |
|   else, | $m_k$ = 4 (Select 16QAM) |
| Else, | $m_k$ = 4 (Select 16QAM) |

Where $TH_L$, $TH_H$, and $TH_E$ are empirical values, 2.0, 3.0, and 1.5, respectively. If $2.0<MPR_k \leq 3.0$, 8PSK ensures the least error rate as compared to QPSK and 16QAM. The performance difference between 8PSK and QPSK is equal to or less than 1.0 dB. Here, $TH_E$ represents 1.5 as a value obtained in an initial transmission. However, The $TH_E$ may have a value different from 1.5. Therefore, even if 8PSK is excluded in selecting a modulation scheme for a retransmission, system performance is not degraded much. Excluding 8PSK, Table 3 is simplified to Table 4.

TABLE 4

| | |
|---|---|
| If $0 < MPR_k \leq TH_M$, | $m_k$ = 2 (Select QPSK) |
| Else, | $m_k$ = 4 (Select 16QAM) |

While $TH_M$ is set to the mean value of $TH_L$ and $TH_H$, 2.5, it can be empirically optimized.

To verify the effectiveness of the above-described modulation scheme determining method for retransmission, simulations were performed under the conditions listed in Table 5 below.

TABLE 5

| | |
|---|---|
| Physical Channel | AWGN |
| EP size | 2304 |
| Number of Chips per Slot | 1536 |
| Walsh Length in Packet Channel | 32 |
| Channel Interleaver | P-BRO Interleaver |
| Modulation Mapping | Systematic Mapping Used |
| Mother Code Rate | 1/5 Turbo Code |
| Decoding Algorithm | Max LogMAP |
| Maximum Number of Iterations | 8 |
| HARQ Scheme | IR |
| Maximum Number of Retransmissions | 1 |

Figure 2:
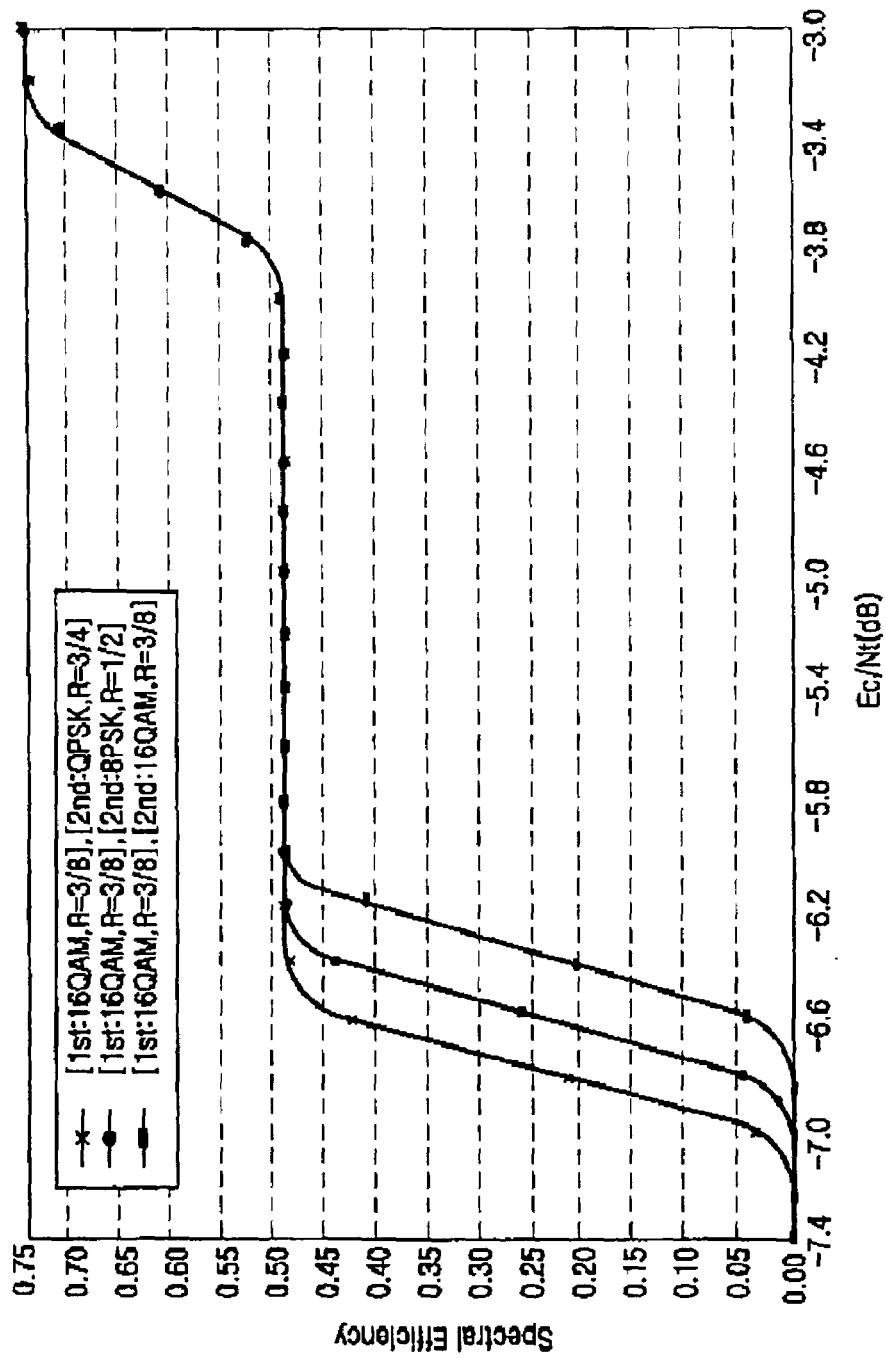
FIG. 2 illustrates graphs showing spectral efficiency versus $E_c/N_t$ (dB) in QPSK, 8PSK, and 16QAM for retransmission when $MPR_2=1.5$ and $MPR_e=0.5$.
Figure 3:
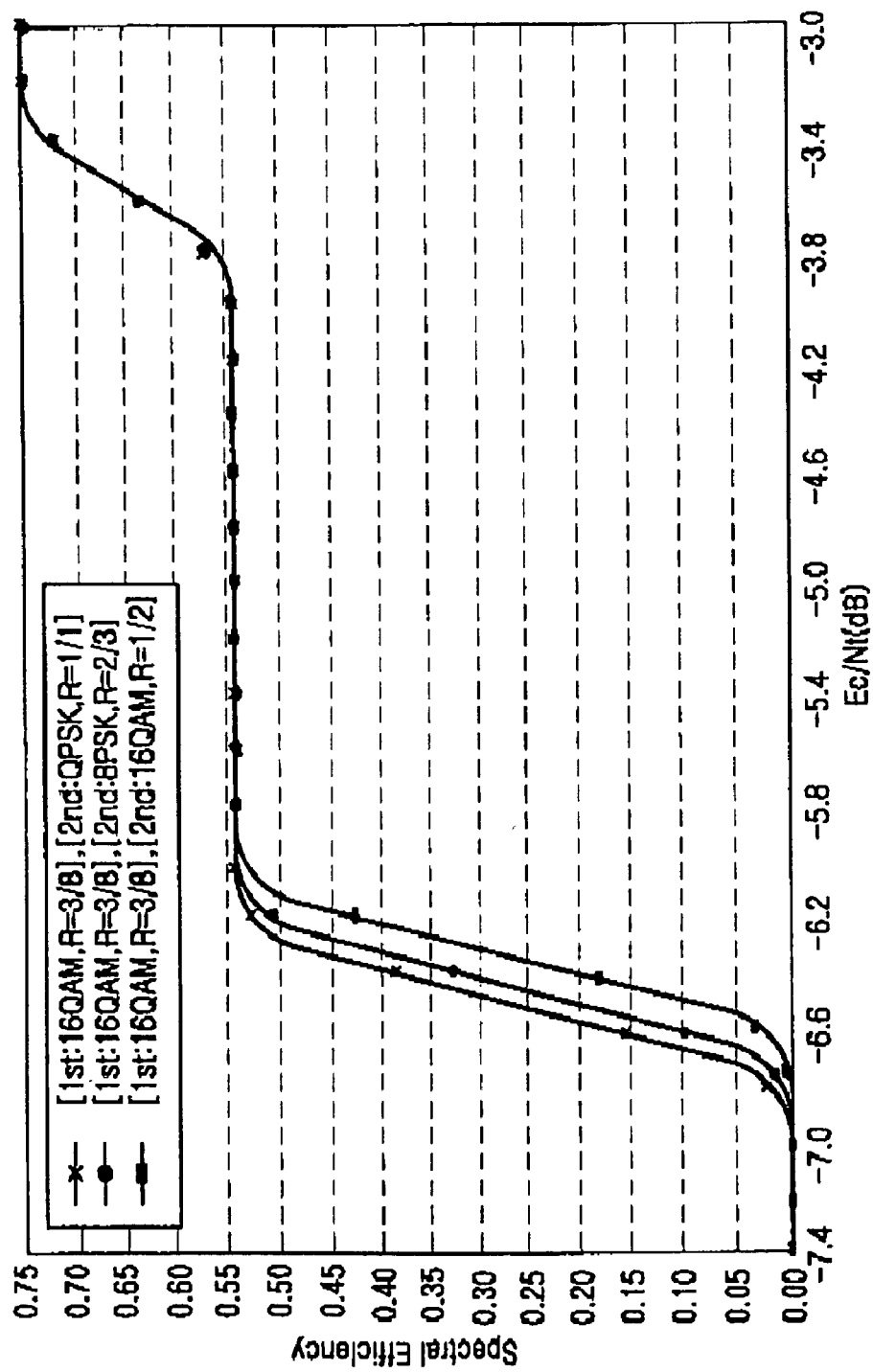
FIG. 3 illustrates graphs showing spectral efficiency versus $E_c/N_t$ (dB) in QPSK, 8PSK, and 16QAM for retransmission when $MPR_2=2.0$ and $MPR_e=0.545$.

Simulations 1, 2 and 3 are about the case where $0<MPR_2 \leq 2.0$. Table 6 lists simulation conditions for an initial transmission and a retransmission in Simulations 1, 2 and 3. FIGS. 1, 2 and 3 illustrate graphs showing spectral efficiency versus Ec/Nt (dB) according to modulation schemes used for the retransmission in Simulations 1, 2 and 3, respectively. Thus, FIG. 1 shows graphs for simulation 1, FIG. 2 shows graphs for simulation 2 and FIG. 3 shows graphs for simulation 3. Ec/Nt (dB) is a SNR (Signal to Noise Ratio), representing a ratio of energy per chip to noise power density. As shown in FIGS. 1, 2 and 3, Ec/Nt (dB) required to achieve the same spectral efficiency is less when QPSK (modulation order=2) is used than when 8PSK (modulation order=3) or 16QAM (modulation order=4) is used for the retransmission. That is, QPSK is optimum for the retransmission according to Table 3.

TABLE 6

|  | 1st TX (k = 1) | 2nd TX (k = 2) |
|---|---|---|
| Simulation 1 |  |  |
| Walsh code Space | 16 | 16 |
| Number of Slots per Sub-packet | 2 | 2 |
| $MPR_k$ | 1.5 | 1.5 |
| $MPR_e$ |  | 0.75 |
| Simulation 2 |  |  |
| Walsh code Space | 16 | 8 |
| Number of Slots per Sub-packet | 4 | 4 |
| $MPR_k$ | 0.75 | 1.5 |
| $MPR_e$ |  | 0.5 |
| Simulation 3 |  |  |
| Walsh code Space | 16 | 6 |
| Number of Slots per Sub-packet | 4 | 4 |
| $MPR_k$ | 0.75 | 2.0 |
| $MPR_e$ |  | 0.5 |

Figure 4:
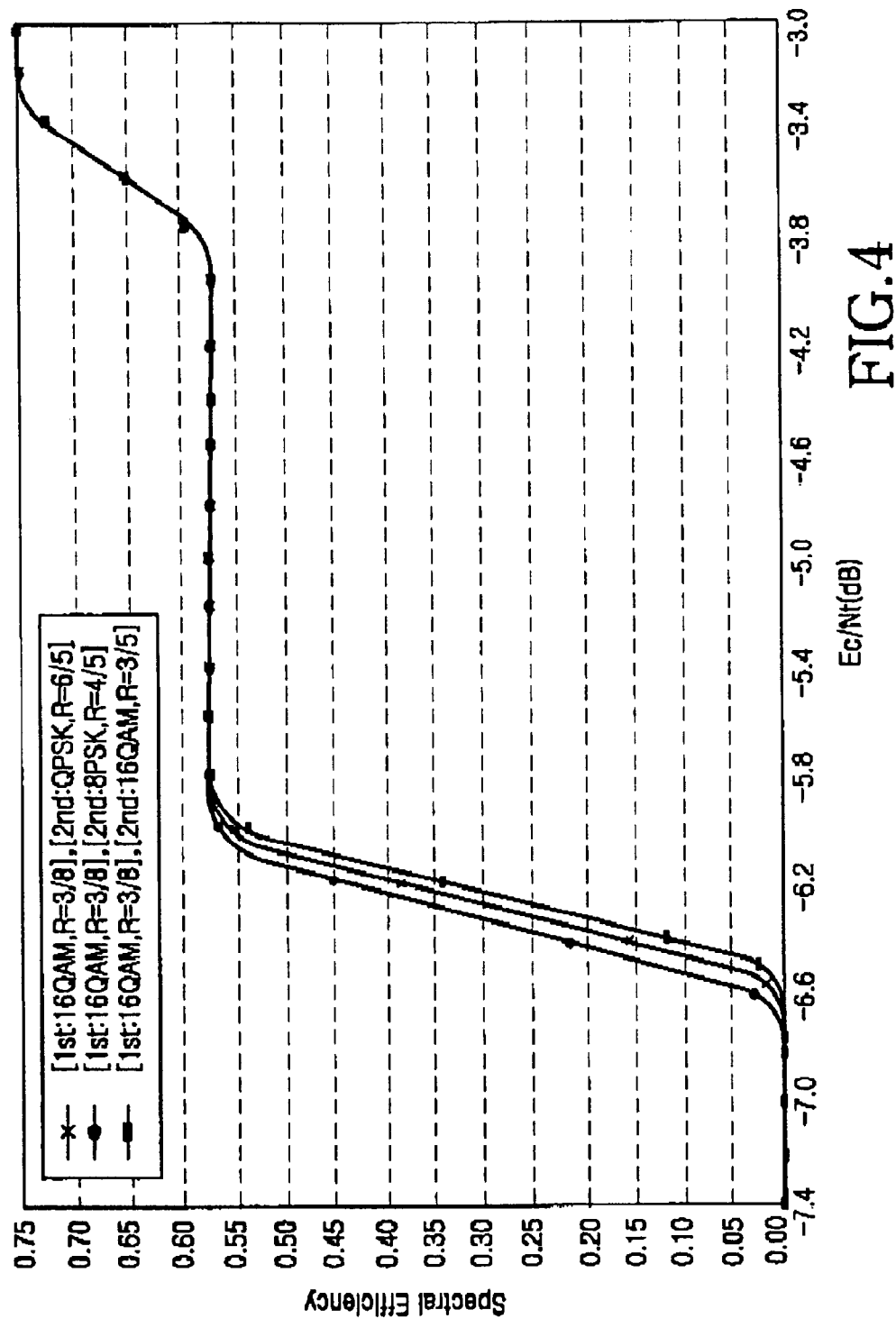
FIG. 4 illustrates graphs showing spectral efficiency versus $E_c/N_t$ (dB) in QPSK, 8PSK, and 16QAM for retransmission when $MPR_2=2.4$ and $MPR_e=0.571$.
Figure 5:
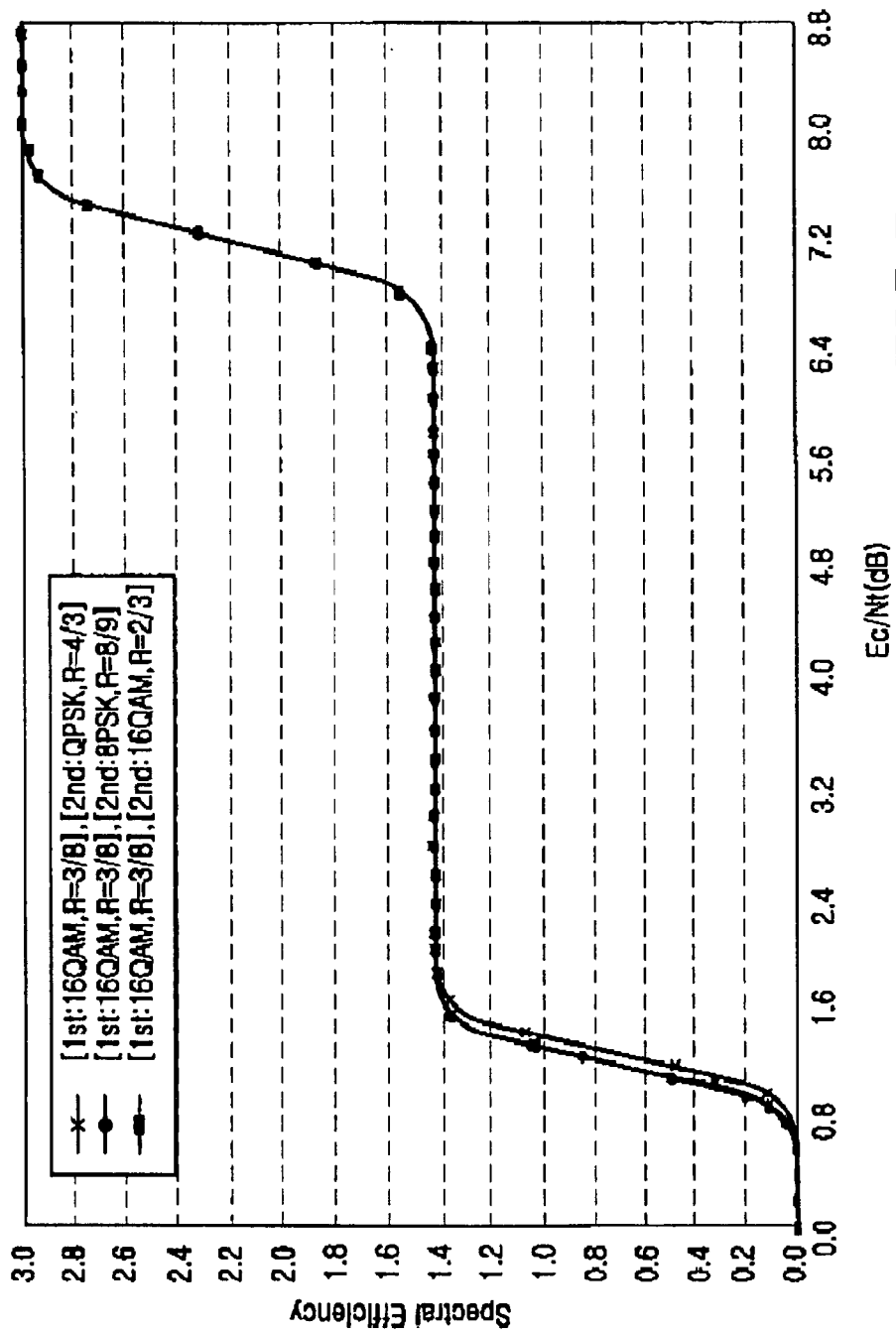
FIG. 5 illustrates graphs showing spectral efficiency versus $E_c/N_t$ (dB) in QPSK, 8PSK, and 16QAM for retransmission when $MPR_2=2.667$ and $MPR_e=1.412$.
Figure 6:
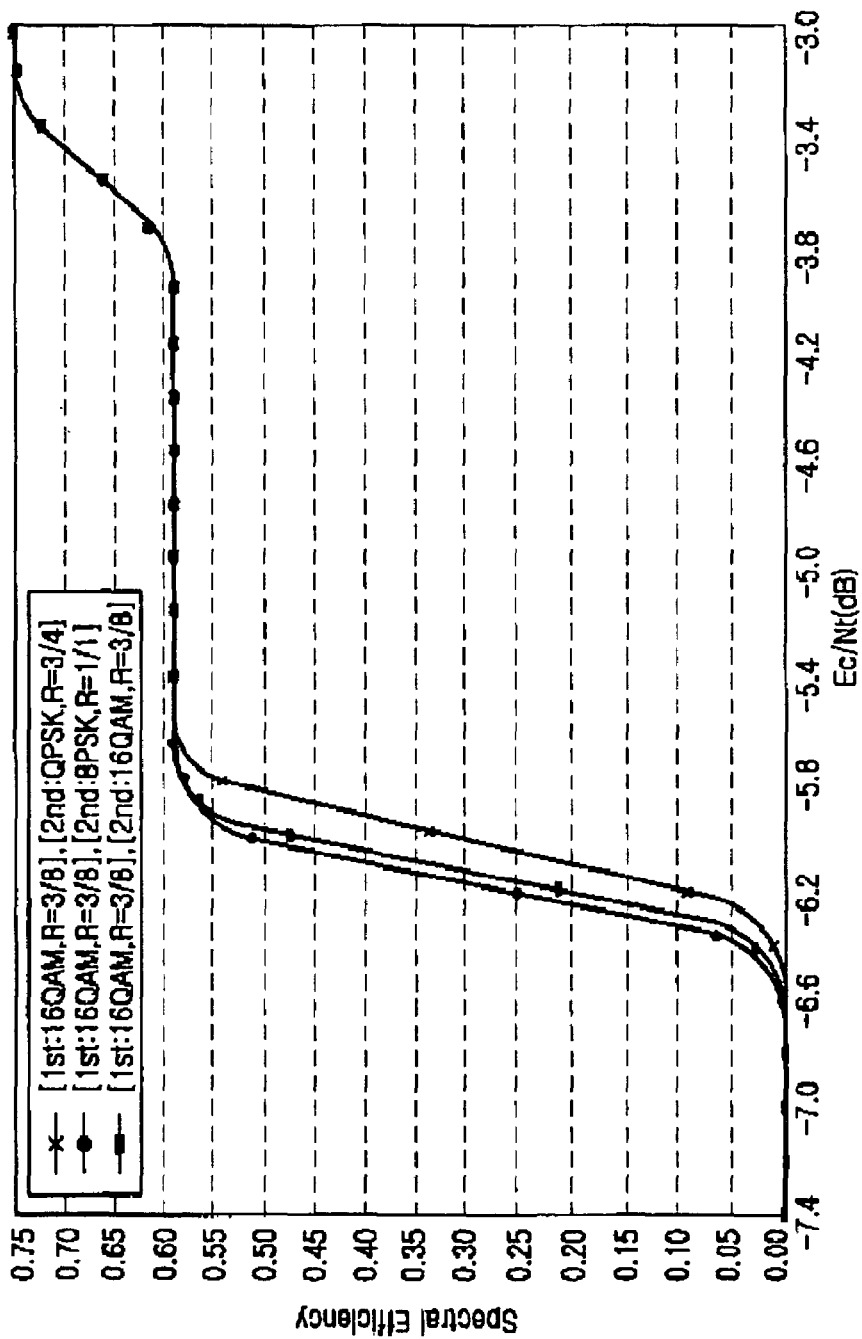
FIG. 6 illustrates graphs showing spectral efficiency versus $E_c/N_t$ (dB) in QPSK, 8PSK, and 16QAM for retransmission when $MPR_2=3.0$ and $MPR_e=0.6$.

Simulations 4, 5 and 6 are about the case where $2.0 < MPR_2 \leq 3.0$. Table 7 lists simulation conditions for an initial transmission and a retransmission in Simulations 4, 5 and 6. FIGS. 4, 5 and 6 illustrate graphs showing spectral efficiency versus Ec/Nt (dB) according to modulation schemes used for the retransmission in simulations 4, 5 and 6, respectively. As noted from FIGS. 4, 5 and 6, Ec/Nt (dB) required to achieve the same spectral efficiency is less when 8PSK (modulation order=3) is used than when QPSK (modulation order=2) or 16QAM (modulation order=4) is used for the retransmission. That is, 8PSK is optimum for the retransmission for these cases where $MPR_e < 1.5$, according to Table 3. However, the performance difference between 8PSK and 16QAM is less than 0.1 dB.

TABLE 7

|  | 1st TX (k = 1) | 2nd TX (k = 2) |
|---|---|---|
| Simulation 1 |  |  |
| Walsh code Space | 16 | 5 |
| Number of Slots per Sub-packet | 4 | 4 |
| $MPR_k$ | 0.75 | 2.4 |
| $MPR_e$ |  | 0.571 |
| Simulation 2 |  |  |
| Walsh code Space | 16 | 18 |
| Number of Slots per Sub-packet | 1 | 1 |
| $MPR_k$ | 3.0 | 2.667 |
| $MPR_e$ |  | 1.412 |
| Simulation 3 |  |  |
| Walsh code Space | 16 | 4 |
| Number of Slots per Sub-packet | 4 | 4 |
| $MPR_k$ | 0.75 | 3.0 |
| $MPR_e$ |  | 0.6 |

Figure 7:
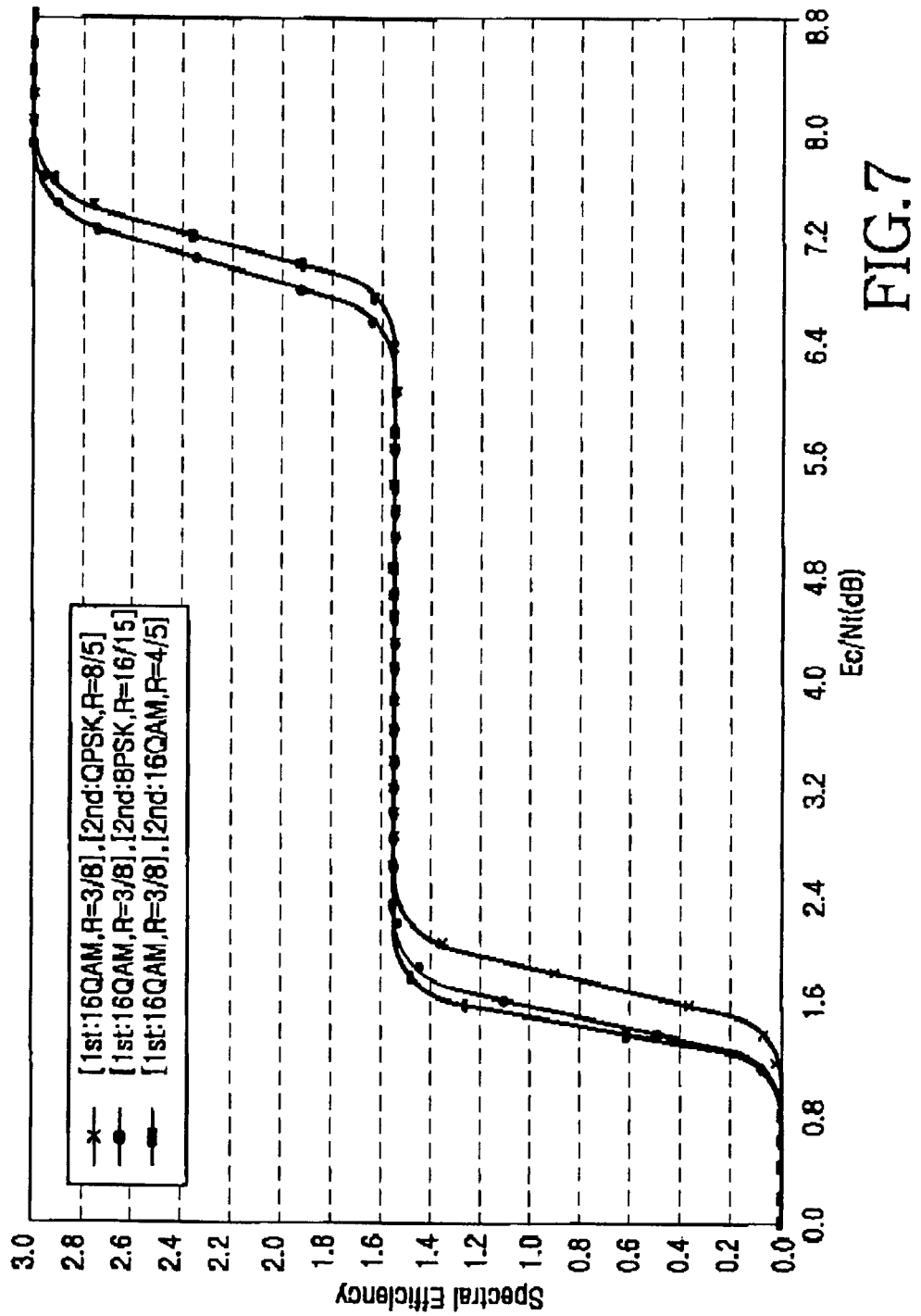
FIG. 7 illustrates graphs showing spectral efficiency versus $E_c/N_t$ (dB) in QPSK, 8PSK, and 16QAM for retransmission when $MPR_2=3.2$ and $MPR_e=1.548$.
Figure 8:
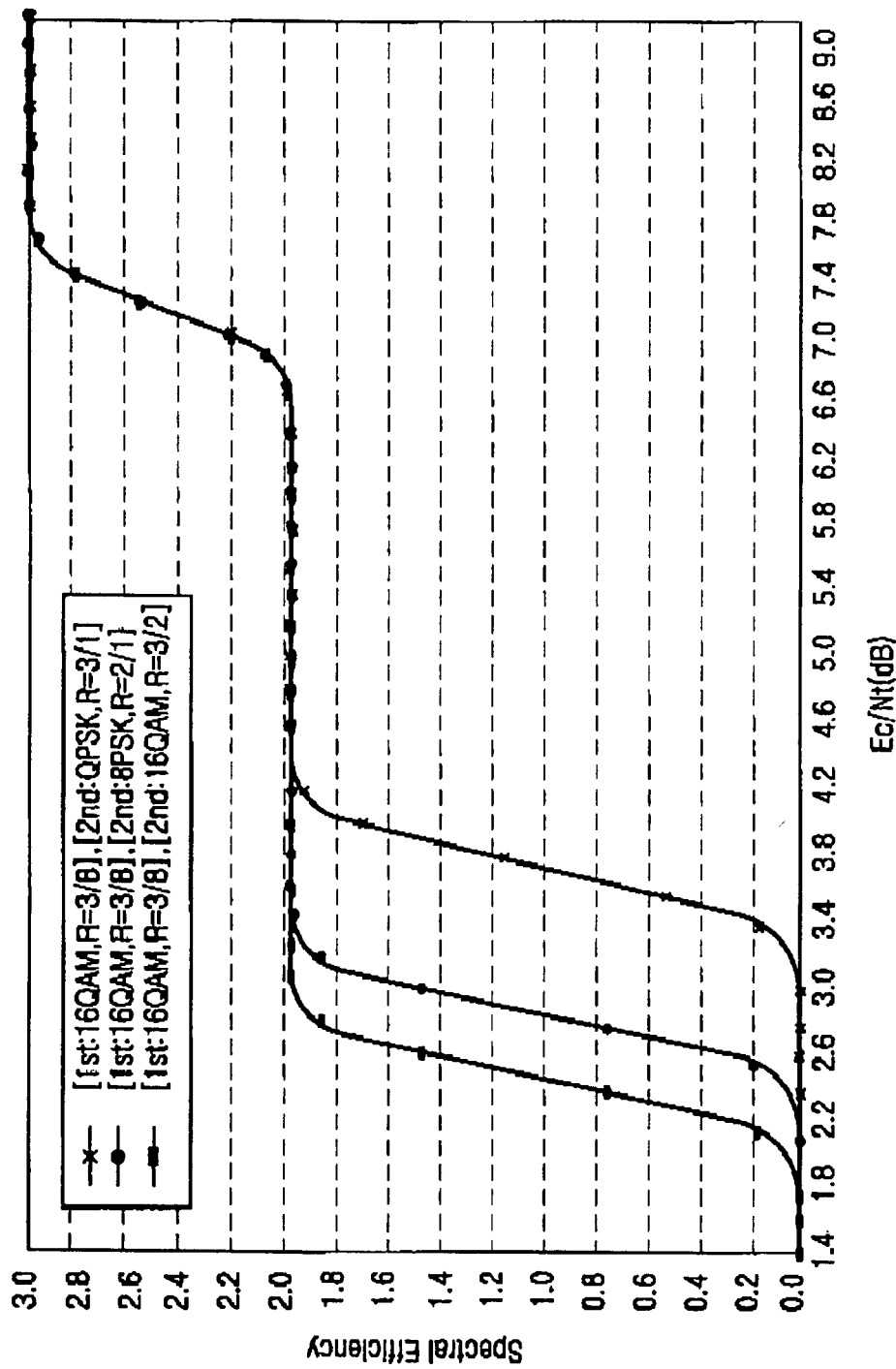
FIG. 8 illustrates graphs showing spectral efficiency versus $E_c/N_t$ (dB) in QPSK, 8PSK, and 16QAM for retransmission when $MPR_2=6.0$ and $MPR_e=2.0$.
Figure 9:
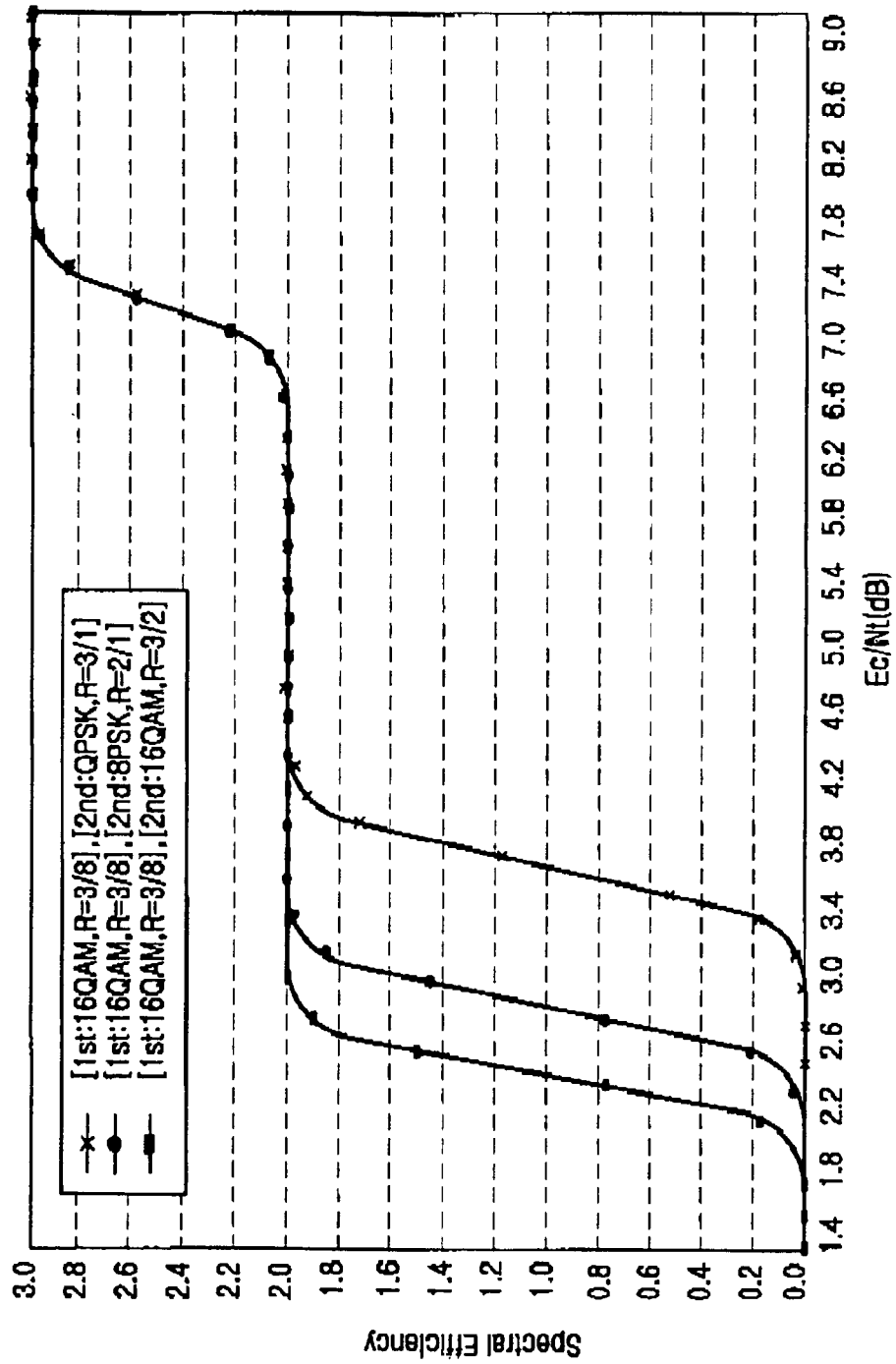
FIG. 9 illustrates graphs showing spectral efficiency versus $E_c/N_t$ (dB) in QPSK, 8PSK, and 16QAM for retransmission when $MPR_2=6.0$ and $MPR_e=1.2$.

Simulations 7, 8 and 9 are about the case where $MPR_2 > 3.0$. Table 8 lists simulation conditions for an initial transmission and a retransmission in Simulations 7, 8 and 9. FIGS. 7, 8 and 9 illustrate graphs showing spectral efficiency versus Ec/Nt (dB) according to modulation schemes used for the retransmission in simulations 7, 8 and 9, respectively. As seen from FIGS. 7, 8 and 9, Ec/Nt (dB) required to achieve the same spectral efficiency is less when 16QAM (modulation order=4) is used than when QPSK (modulation order=2) or 8PSK (modulation order=3) is used for the retransmission. That is, 16QAM is optimum for the retransmission according to Table 3.

TABLE 8

|  | 1st TX (k = 1) | 2nd TX (k = 2) |
|---|---|---|
| Simulation 1 |  |  |
| Walsh code Space | 16 | 15 |
| Number of Slots per Sub-packet | 1 | 1 |
| $MPR_k$ | 3.0 | 3.2 |
| $MPR_e$ |  | 1.548 |
| Simulation 2 |  |  |
| Walsh code Space | 16 | 8 |
| Number of Slots per Sub-packet | 1 | 1 |
| $MPR_k$ | 3.0 | 6.0 |
| $MPR_e$ |  | 2.0 |
| Simulation 3 |  |  |
| Walsh code Space | 16 | 4 |
| Number of Slots per Sub-packet | 2 | 2 |
| $MPR_k$ | 1.5 | 6.0 |
| $MPR_e$ |  | 1.2 |

The structure and operation of the present invention based on the above-described principle and simulation results will be described below.

Figure 10:
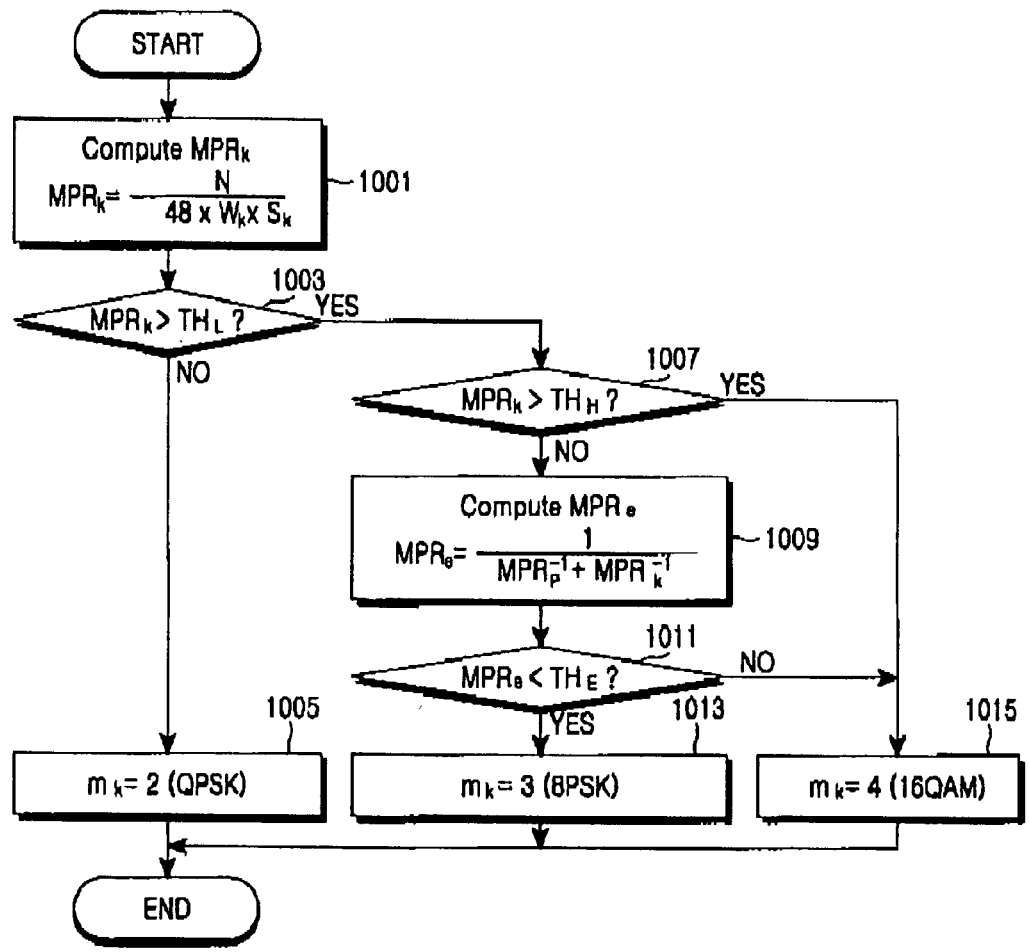
FIG. 10 is a flowchart illustrating an operation for determining a modulation scheme for a retransmission according to an embodiment of the present invention.

FIG. 10 is a flowchart illustrating an operation for determining a modulation scheme (or a modulation order) for a retransmission when QPSK, 8PSK and 16QAM are available for the retransmission in a system using a retransmission scheme according to an embodiment of the present invention. This operation is performed according to Table 3 in a modulator selector 1407 illustrated in FIG. 14.

Referring to FIG. 10, the modulator selector 1407 calculates the current spectral efficiency $MPR_k$ by Eq. (5) using an EP size, the number of available Walsh codes, and the number of slots per sub-packet for the current retransmission in step 1001. In step 1003, the modulator selector 1407 compares $MPR_k$ with a predetermined first threshold $TH_L$. $TH_L$ is empirically determined, 2.0 here. If $MPR_k$ is equal to or less than $TH_L$, the modulator selector 1407 determines a modulation order $m_k$ for the current retransmission as 2, or selects QPSK as an optimum modulation scheme in step 1005.

If $MPR_k$ is greater than $TH_L$, the modulator selector 1407 compares $MPR_k$ with a predetermined second threshold $TH_H$ in step 1007. $TH_H$ is also empirically determined, 3.0 here. If $MPR_k$ is equal to or less than $TH_H$, the modulator selector 1407 calculates by Eq. (6) an equivalent spectral efficiency $MPR_e$ reflecting the previous transmissions at time 1 to time (k−1) and the current retransmission at time k using $MPR_k$ and the spectral efficiency $MPR_p$ of the previous sub-packet transmissions in step 1009.

In step 1011, the modulator selector 1407 compares $MPR_e$ with a predetermined third threshold $TH_E$. $TH_E$ is empirically determined, 1.5 here. If $MPR_e$ is less than $TH_E$, the modulator selector 1407 determines $m_k$ as 3, or selects 8PSK as an optimum modulation scheme in step 1013. If MPR$_e$ is equal to or greater than TH$_E$, the modulator selector 1407 determines m$_k$ as 4, or selects 16QAM as an optimum modulation scheme in step 1015.

If MPR$_k$ is greater than TH$_H$ in step 1007, the modulator selector 1407 determines m$_k$ as 4, or selects 16QAM as an optimum modulation scheme in step 1015.

Figure 11:
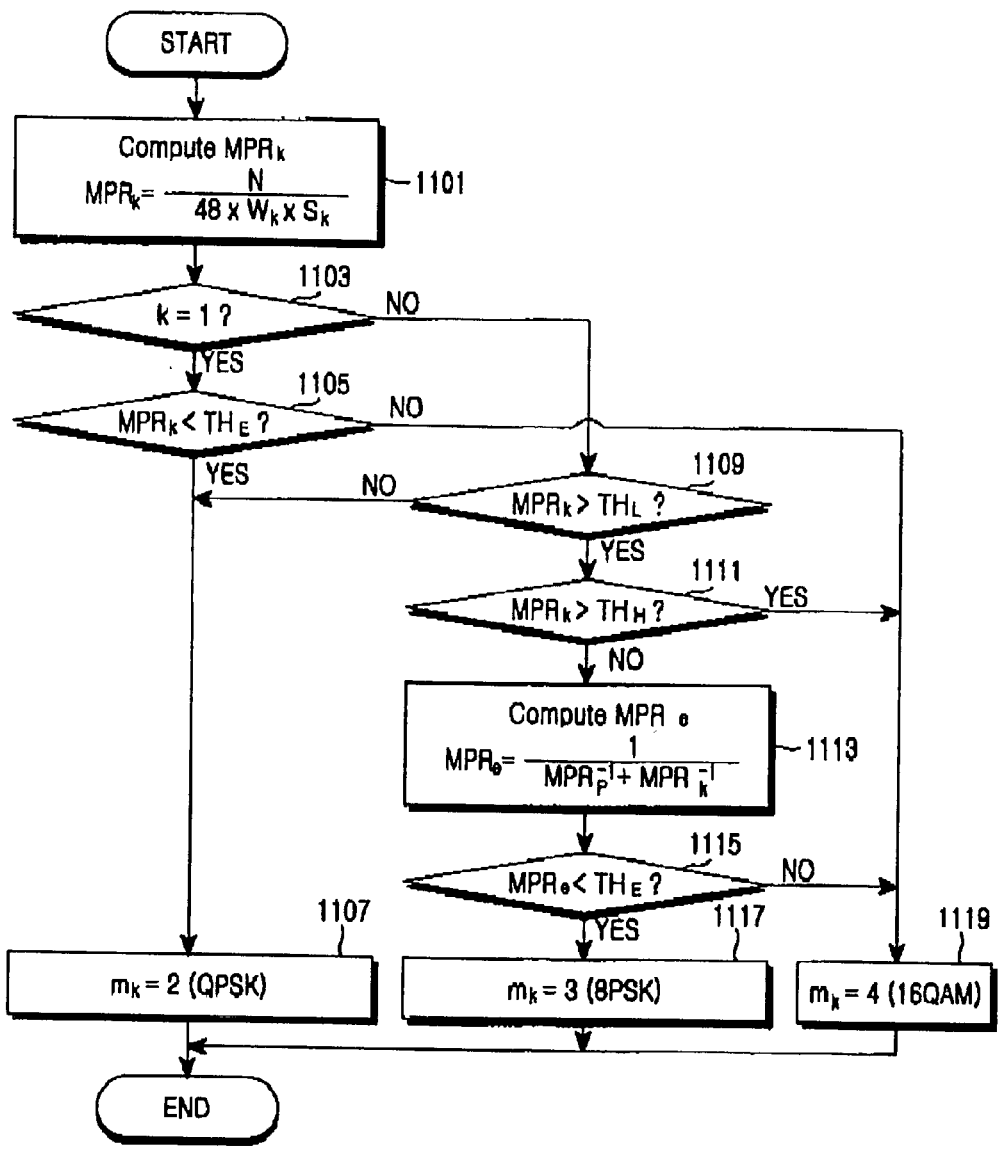
FIG. 11 is a flowchart illustrating an operation for determining modulation schemes for an initial transmission and a retransmission according to the embodiment of the present invention.

FIG. 11 is a flowchart illustrating an operation for determining a modulation scheme (or a modulation order) for an initial transmission and a retransmission when QPSK, 8PSK and 16QAM are available in the system supporting retransmission according to the embodiment of the present invention. This operation is performed according to Table 1 and Table 3 in the modulator selector 1407.

Referring to FIG. 11, the modulator selector 1407 calculates the current spectral efficiency MPR$_k$ by Eq. (5) using an EP size, the number of available Walsh codes, and the number of slots per sub-packet for the current transmission in step 1101. In step 1103, the modulator selector 1407 determines whether the variable indicating the number of transmissions, k, is 1. If k=1, that is, in the case of an initial transmission, the modulator selector 1407 compares MPR$_k$ with TH$_E$ (empirically determined as 1.5) in step 1105. If MPR$_k$ is less than TH$_E$, the modulator selector 1407 determines m$_k$ as 2, or selects QPSK as an optimum modulation scheme in step 1107. On the other hand, if MPR$_k$ is equal to or greater than TH$_E$, the modulator selector 1407 determines m$_k$ as 4, or selects 16QAM as an optimum modulation scheme in step 1119.

In the case of a retransmission (i.e., K>1), the modulator selector 1407 compares MPR$_k$ with TH$_L$ in step 1109. If MPR$_k$ is equal to or less than TH$_L$, the modulator selector 1407 determines m$_k$ as 2, or selects QPSK as an optimum modulation scheme in step 1107. If MPR$_k$ is greater than TH$_L$, the modulator selector 1407 compares MPR$_k$ with TH$_H$ in step 1111. If MPR$_k$ is greater than TH$_H$, the modulator selector 1407 determines m$_k$ as 4, or selects 16QAM as an optimum modulation scheme in step 1119.

On the other hand, if MPR$_k$ is equal to or less than TH$_H$, the modulator selector 1407 calculates by Eq. (6) the equivalent spectral efficiency MPR$_e$ reflecting the previous transmissions at time 1 to time (k−1) and the current retransmission at time k using MPR$_k$ and the spectral efficiency MPR$_p$ of the previous sub-packet transmissions in step 1113.

In step 1115, the modulator selector 1407 compares MPR$_e$ with TH$_E$. TH$_E$ is empirically determined, 1.5 here. If MPR$_e$ is less than TH$_E$, the modulator selector 1407 determines m$_k$ as 3, or selects 8PSK as an optimum modulation scheme in step 1117. If MPR$_e$ is equal to or greater than TH$_E$, the modulator selector 1407 determines m$_k$ as 4, or selects 16QAM as an optimum modulation scheme in step 1119.

Figure 12:
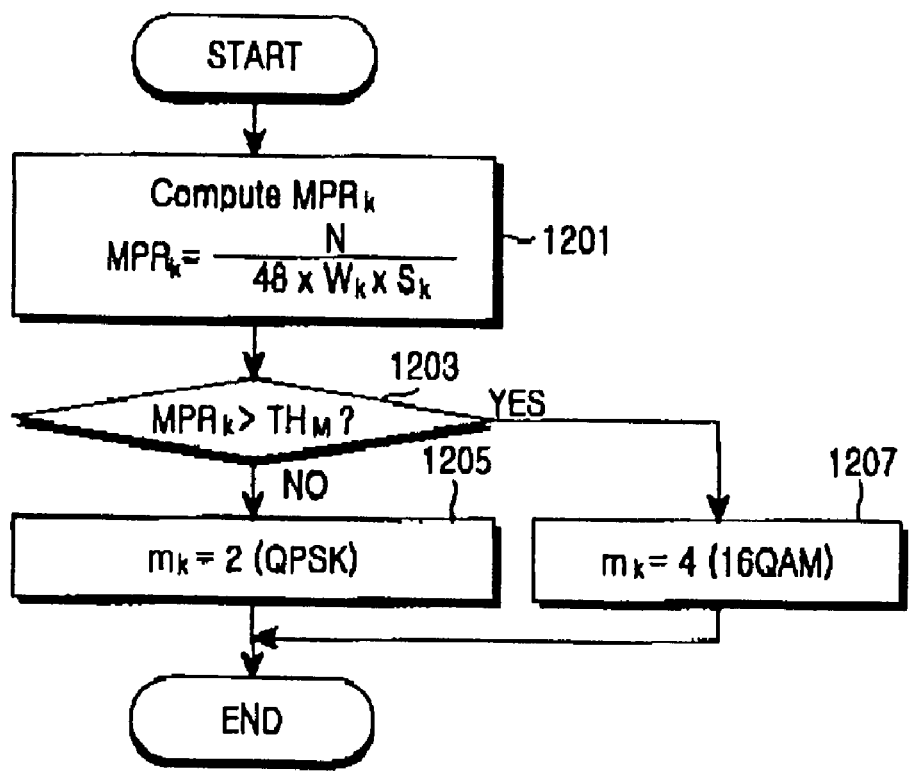
FIG. 12 is a flowchart illustrating an operation for determining a modulation scheme for a retransmission according to another embodiment of the present invention.

FIG. 12 is a flowchart illustrating an operation for determining a modulation scheme (or a modulation order) for a retransmission when QPSK and 16QAM are available for the retransmission in a system using a retransmission scheme according to another embodiment of the present invention. This operation is performed according to Table 4 in the modulator selector 1407.

Referring to FIG. 12, the modulator selector 1407 calculates the current spectral efficiency MPR$_k$ by Eq. (5) using an EP size, the number of available Walsh codes, and the number of slots per sub-packet for the current retransmission in step 1201. In step 1203, the modulator selector 1407 compares MPR$_k$ with a predetermined fourth threshold TH$_M$. TH$_M$ is empirically determined, the mean value 2.5 of TH$_H$ and TH$_L$, here. If MPR$_k$ is equal to or less than TH$_M$, the modulator selector 1407 determines m$_k$ as 2, or selects QPSK as an optimum modulation scheme in step 1205.

If MPR$_k$ is greater than TH$_M$, the modulator selector determines m$_k$ as 4, or selects 16QAM as an optimum modulation scheme in step 1207.

Figure 13:
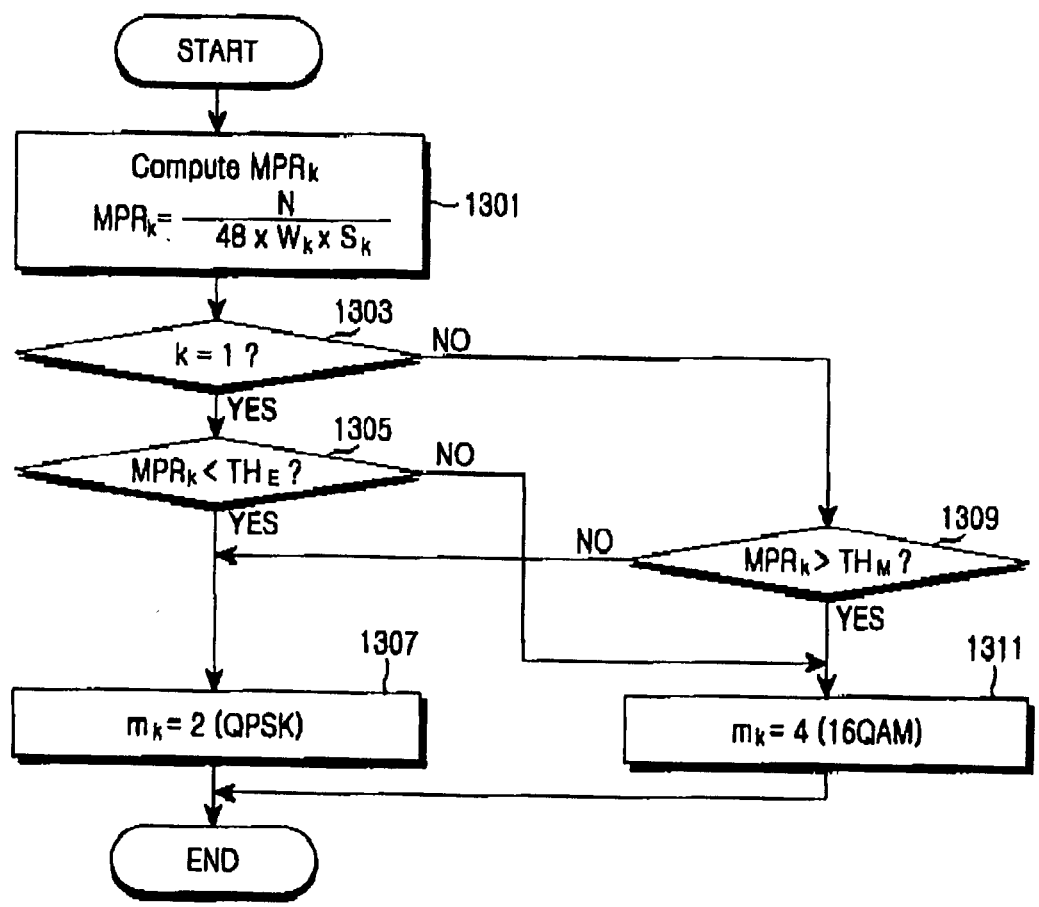
FIG. 13 is a flowchart illustrating an operation for determining modulation schemes for an initial transmission and a retransmission according to the second embodiment of the present invention.

FIG. 13 is a flowchart illustrating an operation for determining a modulation scheme (or a modulation order) for an initial transmission and a retransmission when QPSK and 16QAM are available in the system supporting retransmission according to the second embodiment of the present invention. This operation is performed according to Table 1 and Table 4 in the modulator selector 1407.

Referring to FIG. 13, the modulator selector 1407 calculates the current spectral efficiency MPR$_k$ by Eq. (5) using an EP size, the number of available Walsh codes, and the number of slots per sub-packet for the current transmission in step 1301. In step 1303, the modulator selector 1407 determines whether the variable indicating the number of transmissions, k, is 1. If k=1, that is, in the case of an initial transmission, the modulator selector 1407 compares MPR$_k$ with TH$_E$ in step 1305. If MPR$_k$ is less than TH$_E$, the modulator selector 1407 determines m$_k$ as 2, or selects QPSK as an optimum modulation scheme in step 1307. On the other hand, if MPR$_k$ is equal to or greater than TH$_E$, the modulator selector 1407 determines m$_k$ as 4, or selects 16QAM as an optimum modulation scheme in step 1311.

In the case of a retransmission (i.e., K>1), the modulator selector 1407 compares MPR$_k$ with TH$_M$ in step 1309. If MPR$_k$ is equal to or less than TH$_M$, the modulator selector 1407 determines m$_k$ as 2, or selects QPSK as an optimum modulation scheme in step 1307. If MPR$_k$ is greater than TH$_M$, the modulator selector 1407, the modulator selector 1407 determines m$_k$ as 4, or selects 16QAM as an optimum modulation scheme in step 1311.

Figure 14:
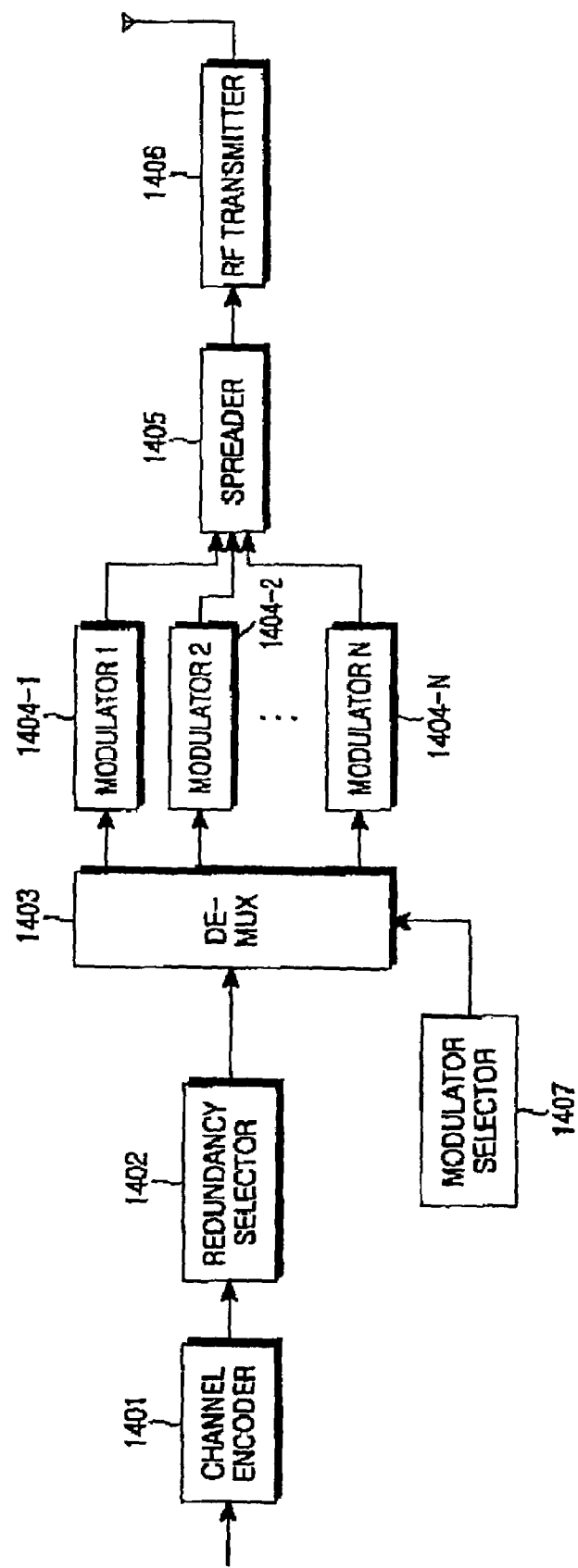
FIG. 14 is a block diagram of a transmitter in a communication system using a plurality of modulation schemes.

FIG. 14 is a block diagram of a transmitter in a communication system using a plurality of modulation schemes according to the present invention.

Referring to FIG. 14, a channel encoder 1401 generates forward error correction codes (FECs) to correct errors in a channel. A redundancy selector 1402 selects predetermined redundancy information corresponding to a code rate according to a predetermined redundancy selection method, upon request for a retransmission. IR is implemented in the redundancy selector 1402. The modulator selector 1407 selects an optimum modulation scheme for the current transmission by a given algorithm and outputs a corresponding selection signal to a demultiplexer (DEMUX) 1403. The DEMUX 1403 feeds the redundancy information to one of modulators 1404-1 to 1404-N according to the selection signal. The modulators 1404-1 to 1404-N modulate input data according to their respective modulation schemes. The modulation schemes can be QPSK (modulation order=2), 8PSK (modulation order=3), and 16QAM (modulation order=4). A spreader 1405, which is optional, spreads the modulated symbols if the system is a CDMA (Code Division Multiple Access) communication system. An RF (Radio Frequency) transmitter transmits the spread signal.

In accordance with the present invention as described above, criterions are presented to adaptively select a modulation and coding scheme (i.e., AMC: Adaptive Modulation and Coding) for a retransmission, taking previous transmission sub-packets into account in a communication system using a variable modulation scheme and IR as an HARQ technique. Therefore, use of an optimum modulation and coding scheme maximizes transmission efficiency.

While the invention has been shown and described with reference to certain preferred embodiments thereof, they are mere exemplary applications. For example, available modulation schemes for transmission are not limited to QPSK, 8PSK, and 16QAM, and the present invention is also applicable to other modulation schemes. Thus, it will be understood by those skilled in the art that various changes in form and details may be made therein without departing from the spirit and scope of the invention as defined by the appended claims.

What is claimed is:

1. A method of determining a modulation scheme for a retransmission in a communication system using at least three modulation schemes, where at an initial transmission of sub-packets, information is modulated in a lowest-order modulation scheme if a first MPR (Modulation order Product code Rate), which is defined as an average number of information bits per modulation symbol, is less than a first threshold, and in a modulation scheme having a modulation order higher than the lowest modulation order if the first MPR is greater than or equal to the first threshold, the first MPR being proportional to $$\frac{N}{W_1 \times S_1},$$

wherein N is an EP (Encoder Packet) size $W_1$ is a number of available Walsh codes, and $S_1$ is a number of slots per sub-packet that are used for the initial transmission, the method comprising the steps of:

calculating a second MPR indicating a spectral efficiency for the retransmission using an EP size, the number of available Walsh codes, and the number of slots per sub-packet that are used for the retransmission;

selecting the lowest-order modulation scheme if the second MPR is equal to or less than a second threshold greater than a first threshold;

calculating an equivalent MPR ($MPR_e$), using the first MPR and the second MPR if the second MPR is greater than the second threshold and equal to or less than a third threshold which is greater than the second threshold, selecting another order modulation scheme among the plurality of modulation schemes which has a higher modulation order than the lowest-order modulation scheme if $MPR_e$ is less than a fourth threshold, and selecting a further order modulation scheme among the plurality of modulation schemes which has a higher modulation order than the lowest-order modulation scheme and the other modulation scheme if $MPR_e$ is greater than or equal to the fourth threshold; and selecting a highest-order modulation scheme if the second MPR is greater than the third threshold.

2. The method of claim 1, wherein the first threshold has a value of 1.5, the second threshold has a value of 2.0, and the third threshold has a value of 3.0.

3. The method of claim 1, wherein $MPR_e$ is calculated by $$MPR_e = \frac{1}{MPR_p^{-1} + MPR_k^{-1}}$$

where $MPR_k$ is a current spectral efficiency for a kth transmission, calculated using an EP size, the number of available Walsh codes, and the number of slots per sub-packet that are used for the kth transmission, and $MPR_p$ is a past spectral efficiency reflecting spectral efficiencies of sub-packets transmitted before the current transmission of the same information.

4. The method of claim 1, wherein the at least three modulation schemes include QPSK (Quadrature Phase Shift Keying), 8PSK (8 Phase Shift Keying), and 16QAM (16 level Quadrature Amplitude Modulation).

5. The method of claim 1, wherein the first, second, third and fourth thresholds are set empirically.

6. The method of claim 5, wherein the first threshold is equal to fourth threshold.

7. A method of determining a modulation scheme for a retransmission in a communication system using two modulation schemes, where at an initial transmission of sub-packets, information is modulated in the lower-order modulation scheme if a first MPR (Modulation order Product code Rate), which is defined as an average number of information bits per modulation symbol, is less than a first threshold, valid in the higher-order modulation scheme if the first MPR is equal to or greater than the first threshold, the first MPR being proportional to $N/W_1 \times S_1$, wherein N is an EP (Encoder Packet) size, $W_1$ is a number of available Walsh codes, and $S_1$ is a number of slots per sub-packet that are used for the initial transmission, the method comprising the steps of:

calculating a second MPR indicating a spectral efficiency for the retransmission using an EP size, the number of available Walsh codes, and the number of slots per sub-packet that are used for the retransmission;

selecting the lower-order modulation scheme if the second MPR is equal to or less than a second threshold greater than the first threshold; and selecting the higher-order modulation scheme which has a higher modulation order than the lower-order modulation scheme, if the second MPR is greater than the second threshold.

8. The method of claim 7, wherein the first threshold has a value of 1.5 and the second threshold is has a value of 2.5.

9. The method of claim 7, wherein the two modulation schemes are QPSK (Quadrature Phase Shift Keying) and 16 QAM (16 level Quadrature Amplitude Modulation).

10. The method of claim 7, wherein the first and second thresholds are set empirically.

11. An apparatus for determining a modulation scheme for a retransmission in a communication system using at least three modulation schemes where information is modulated in one of the modulation schemes at an initial transmission of sub-packets, comprising:

a plurality of modulators using different modulation schemes;

a modulator selector for determining a modulation scheme for each transmission and outputting a modulator selection signal indicating the determined modulation scheme; and a demultiplexer for outputting input data to a modulator selected according to the modulator selection signal, wherein the modulator selector is adapted to determine the modulation scheme for a transmission by the following steps:

determining a modulation order product code rate $MPR_k$, which indicates a current spectral efficiency for a kth transmission and which is proportional to $$\frac{N}{W_1 \times S_1},$$

wherein N is an EP (Encoder packet) size, $W_k$ a number of available Walsh codes, and $S_k$ a number of slots per sub-packet that are used for the kth transmission;

selecting a lowest-order modulation scheme, if $0 \leq MPR_k \leq TH_L$;

in the case that $TH_L < MPR_k \leq TH_H$:

selecting a medium order modulation scheme which has a higher modulation order than the lowest-order modulation scheme, if $MPR_e < TH_E$; and selecting a highest order modulation scheme, which has a higher modulation order than the medium order modulation scheme, if $MPR_e \geq TH_E$, else selecting the highest order modulation scheme, wherein $MPR_e$ is a spectral efficiency reflecting modulation symbols transmitted before the current transmission of the same information and $TH_L$, $TH_H$, and $TH_E$ are predetermined empirical thresholds.

12. The apparatus of claim 11, wherein $TH_L$ has a value of 2.0, $TH_H$ has a value of 3.0, and $TH_E$ has a value of 1.5.

13. An apparatus for determining a modulation scheme for a retransmission in a communication system where at an initial transmission of sub-packets, information is modulated in one of two available modulation schemes, comprising:

a plurality of modulators using different modulation schemes;

a modulator selector for determining a modulation scheme for each transmission by an algorithm expressed as the following equation and outputting a modulator selection signal indicating the determined modulation scheme, and a demultiplexer for outputting input data to a modulator selected according to the modulator selection signal, wherein the modulator selector is adapted to determine the modulation scheme for a transmission by following steps:

determining a modulation order product code rate $MPR_k$, which indicates a current spectral efficiency for a kth transmission and which is proportional to $$\frac{N}{W_1 \times S_1},$$

wherein N is an EP (Encoder packet) size, $W_k$ is a number of available Walsh codes, and $S_k$ is a number of slots per sub-packet that are used for the kth transmission;

selecting a lower order modulation scheme, if $0 < MPR_k \leq TH_M$;

else selecting a higher order modulation scheme which has a higher modulation order than the lower order modulation scheme, wherein $TH_M$ is a predetermined empirical threshold.

14. The apparatus of claim 13, wherein $TH_M$ has a value of 2.5.

\* \* \* \* \*